US010054688B2

(12) United States Patent
Jakupi et al.

(10) Patent No.: US 10,054,688 B2
(45) Date of Patent: Aug. 21, 2018

(54) METHOD AND APPARATUS FOR SAVING POWER DURING SYNTHETIC POSITIONING IN GNSS RECEIVERS

(71) Applicant: Samsung Electronics Co., Ltd., Gyeonggi-do (KR)

(72) Inventors: Andi Jakupi, Marion, IA (US); John Mettenburg, Cedar Rapids, IA (US)

(73) Assignee: Samsung Electronics Co., Ltd (KR)

( * ) Notice: Subject to any disclaimer, the term of this patent is extended or adjusted under 35 U.S.C. 154(b) by 275 days.

(21) Appl. No.: 14/989,415

(22) Filed: Jan. 6, 2016

(65) Prior Publication Data

US 2017/0123073 A1 May 4, 2017

Related U.S. Application Data

(60) Provisional application No. 62/250,271, filed on Nov. 3, 2015, provisional application No. 62/251,840, filed on Nov. 6, 2015.

(51) Int. Cl.
*G01S 19/26* (2010.01)
*G01S 19/49* (2010.01)
*G01S 19/34* (2010.01)

(52) U.S. Cl.
CPC .............. *G01S 19/26* (2013.01); *G01S 19/49* (2013.01); *G01S 19/34* (2013.01)

(58) Field of Classification Search
CPC .................................. G01S 19/26; G01S 19/49
USPC ....................................................... 342/357.65
See application file for complete search history.

(56) References Cited

U.S. PATENT DOCUMENTS

| | | | |
|---|---|---|---|
| 2009/0299573 A1* | 12/2009 | Thrun | B62D 15/025 701/41 |
| 2011/0071759 A1 | 3/2011 | Panda et al. | |
| 2013/0018581 A1 | 1/2013 | Sidhu et al. | |
| 2013/0166193 A1 | 6/2013 | Goldman et al. | |
| 2013/0210408 A1* | 8/2013 | Hohteri | G06F 1/3231 455/418 |
| 2013/0288718 A1* | 10/2013 | MacGougan | H04W 52/0254 455/456.4 |
| 2014/0278054 A1 | 9/2014 | Tidd et al. | |
| 2015/0279213 A1* | 10/2015 | Balter | G08G 1/144 705/13 |
| 2016/0069690 A1* | 3/2016 | Li | G01C 21/206 701/412 |
| 2017/0192101 A1* | 7/2017 | Cho | G01S 19/34 |

* cited by examiner

*Primary Examiner* — Harry K Liu
(74) *Attorney, Agent, or Firm* — The Farrell Law Firm, P.C.

(57) ABSTRACT

A method and apparatus for saving power during synthetic positioning in Global Navigation Satellite System (GNSS) receivers is provided. According to one embodiment, a device includes a Global Navigation Satellite System (GNSS) receiver, and an inertial sensor block. The GNSS receiver is disabled when the device enters a dead zone, and the device uses data from the inertial sensor block and a remotely located database to perform navigation functions.

18 Claims, 4 Drawing Sheets

METHOD AND APPARATUS FOR SAVING POWER DURING SYNTHETIC POSITIONING IN GNSS RECEIVERS

PRIORITY

This application claims priority under 35 U.S.C § 119(e) to U.S. Provisional Patent Application No. 62/250,271 filed on Nov. 3, 2015 and to U.S. Provisional Patent Application No. 62/251,840 filed on Nov. 6, 2015, the entire content each of which is incorporated herein by reference.

BACKGROUND

1. Field of the Disclosure

The present disclosure generally relates to a geo-spatial positioning, and more particularly, to an apparatus and method for determining geo-spatial positions using the combination of a Global Navigation Satellite System (GNSS) receiver, inertial sensors, a remotely located database and polynomial curve fitting in a mobile electronic device.

2. Description of the Related Art

Mobile electronic devices contain hardware and software for determining the geo-spatial position of the devices. Current and new applications for geo-spatial positioning are placing additional requirements on the devices and methods used to determine position. Typical mobile electronic devices use a GNSS receiver for positioning, and in particular, the Global Positioning System (GPS). A GNSS receiver is an electronic component that receives and processes the signals from GNSS satellites and is able to determine the receiver's position, velocity, and current time in order to enable navigation and other applications. Currently, GNSS receivers in mobile electronic devices are fully powered during periods of time when the receivers are unable to receive sufficient signal strength from the satellites, such as when they are in areas referred to as dead-zones. Powering the receiver at these times can contribute to unnecessary power consumption by the receiver, while it is fully aware of operating in a dead-zone.

In addition, users of the mobile electronic devices are requiring increased accuracy and availability of the positioning applications. In particular, users are requiring accurate positioning in the dead-zone areas where the satellite signals required for GNSS receivers based navigation are not available due to the signal attenuation or blocking by objects interfering with such signals, including inside buildings, tunnels, urban canyons (an urban canyon is where the street is flanked by buildings on both sides creating a canyon-like environment) and other obstructions. In the past, GNSS receiver systems have provided sufficient geo-spatial positioning to navigation and other applications when the receiver has a clear line of sight view of the satellites. However, positioning without a clear line of sight to the satellites has remained a technical challenge.

SUMMARY

The present disclosure has been made to address the above problems and disadvantages and to provide at least the advantages described below.

In accordance with an aspect of the present disclosure, a device is provided which includes a GNSS receiver and an inertial sensor block, wherein the GNSS receiver is disabled when the device enters a dead zone, and the device uses data from the inertial sensor block and a remotely located database to perform navigation functions.

In accordance with an aspect of the present disclosure, a method is provided which includes receiving signals from a GNSS receiver, and receiving sensor data from an inertial sensor block and a remotely located database, wherein the GNSS receiver is disabled when the device enters a dead zone, and the device uses data from the inertial sensor block to perform navigation functions.

BRIEF DESCRIPTION OF THE DRAWINGS

The above and other aspects, features and advantages of the present disclosure will become more apparent by describing in detail embodiments thereof with reference to the attached drawings in which.

DETAILED DESCRIPTION

Figure 1:
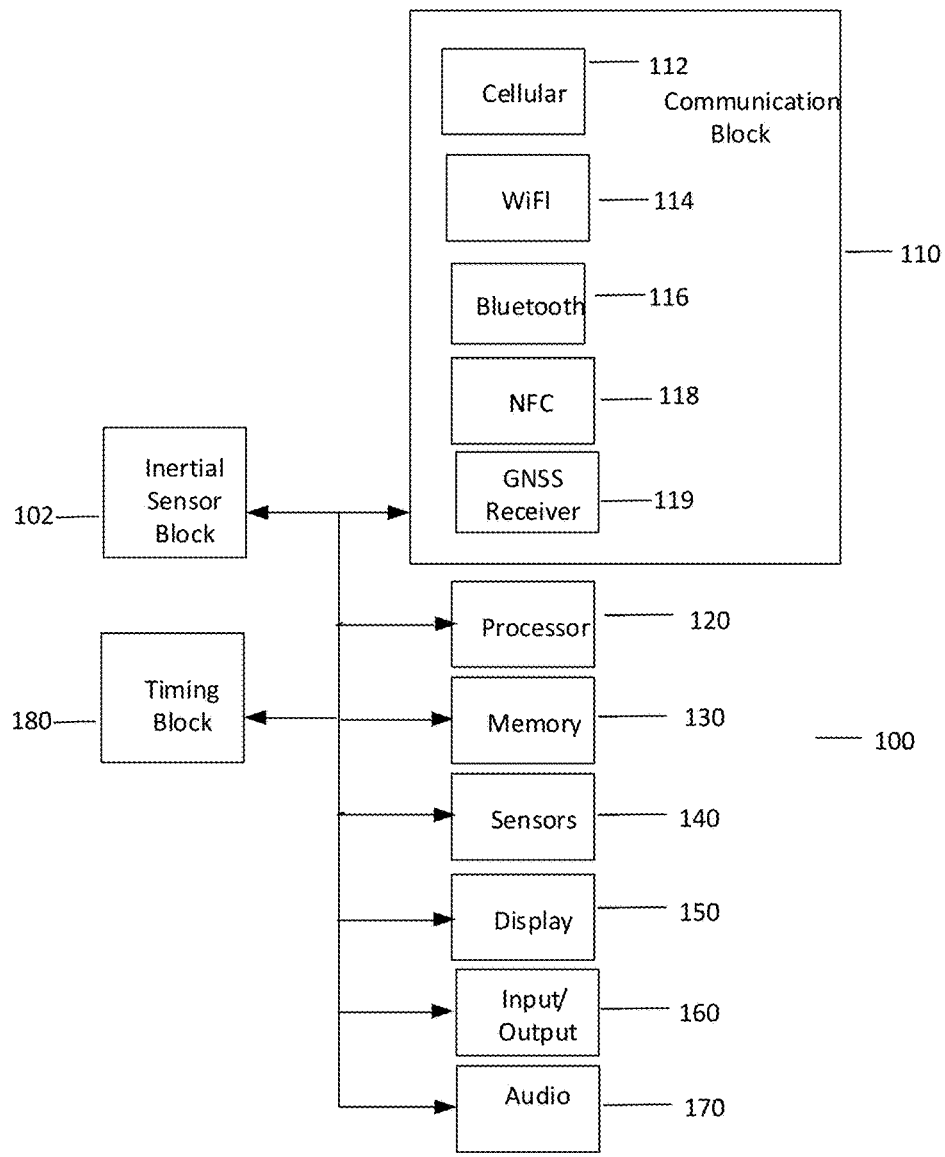
FIG. 1 is a schematic block diagram of an electronic device, according to an embodiment of the present disclosure.

The present disclosure will now be described more fully hereinafter with reference to the accompanying drawings, in which embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the device and method to those skilled in the art. In the drawings, the size and relative sizes of layers and regions may be exaggerated for clarity. Like reference numbers refer to like elements throughout.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein, the term "and/or" includes, but is not limited to any and all combinations of one or more of the associated listed items.

It will be understood that, although the terms first, second, and other terms may be used herein to describe various elements, these elements should not be limited by these terms. These terms are only used to distinguish one element from another. For example, a first signal could be referred to as a second signal, and, similarly, a second signal could be referred to as a first signal without departing from the teachings of the disclosure.

The terminology used herein is for the purpose of describing particular embodiments only and is not intended to be limiting of the present device and method. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the present device and method belongs. It will be further understood that terms, such as those defined in commonly used dictionaries, should be interpreted as having meanings that are consistent with their meaning in the context of the relevant art and/or the present description, and will not be interpreted in an idealized or overly formal sense unless expressly so defined herein.

In geo-spatial positioning applications and systems of mobile electronic devices, it is often necessary to accurately track a device's position independently of whether the device has a clear line of sight to the satellites providing the signals to the GNSS receiver. According to the present disclosure, a device and method are provided which allow geo-spatial positioning using a GNSS receiver when there is a clear view of the satellites and the signal strength from the satellites is sufficient for the GNSS receiver to determine position and perform navigation, and switching over to an inertial sensor based on a dead-reckoning method when the device does not have sufficient signal strength from the satellites.

According to the present disclosure, switching over to the inertial sensor based dead-reckoning method for positioning and navigation allows for the GNSS receiver to turn off some or all of its receiver and signal processing circuits in order to reduce power consumption in the device and extend battery charge time. Recent technology advancements in inertial sensors produced using microelectromechanical systems (MEMs) is enabling the advancement in dead-reckoning positioning methods.

According to the present disclosure, the GNSS receiver and electronic device processor dynamically build a database of dead-zones and generate poly-fit curves. The database may be stored locally on the device or it may be stored on a remote server and accessed using a network such as Wi-Fi, LTE, 3G, CDMA, and the like. Over time, the polynomial coefficients become mature and the system will stop its learning and strictly apply the position coefficients retrieved from the database. Using data from the inertial sensors, a navigation library capable of generating dead-reckoning positions with the position information is generated and there will be no need to keep most of the digital signal processing and receiver blocks powered up.

FIG. 1 is a schematic block diagram of an electronic device 100 according to an embodiment of the present disclosure. The electronic device 100 contains an inertial sensor block 102 for providing inertial sensor data and other measured data required for positioning. The electronic device 100 also includes a communication block 110, a processor 120, a memory 130, a plurality of sensors 140, a display 150, an input/output block 160 and an audio block 170.

The electronic device 100 includes, but is not limited to, a communication block 110 for connecting the device 100 to a network for communication of voice and data. The communication block 110 contains wide area, local area, personal area, near field and short range communications. The communication block 110 includes a GNSS satellite signal receiver 119. In particular, the cellular communications block 112 provides a wide area network connection through terrestrial base transceiver stations using technologies such as Long Term Evolution. The WiFi communications block 114 provides a local area network connection through network access points using technologies such as IEEE802.11. The Bluetooth communications block 116 provides personal area direct and networked communications using technologies such as IEEE802.15. The Near Field Communications (NFC) block 118 provides point to point short range communications using standards such as ISO/IEC 14443. The GNSS receiver 119 provides for receiving Global Navigation Satellite Signals in order to compute the device's absolute position, velocity, acceleration and time.

The processor 120 provides application layer processing functions required by the user of the electronic device 100. The processor 120 also provides command and control functionality for the various blocks in the device 100. The processor 120 provides for updating temperature compensation, calibration or other control functions required by the functional blocks. The processor 120 may provide for coordination of the GNSS receiver and dead-reckoning positioning methods. The processor 120 may also compute position, velocity, bearing and other variables based on the measurements provided from the inertial sensor block 102. The processor 120 may also update the databases and libraries associated with the GNSS receiver and dead reckoning based positioning methods.

The memory 130 provides storage for device control program code, user data storage, application code and data storage. The memory 130 may provide data storage for the libraries, databases, look up tables and calibration data required for computing position and other navigation related variables. The databases may include latitude coordinates, longitude coordinates, polynomial coefficients, variable weighting factors, maturity value indicators, and the like. The program code and calibration data required by the inertial sensor block 102 may be loaded into local storage within the inertial sensor block 102 from the memory 130 upon device boot up. The inertial sensor block 102 may also have local non-volatile memory for storing the program code, libraries, databases and look up table data. The plurality of sensors 140 may contain physical sensing devices for sensing physical conditions internal and external to the electronic device 100. The plurality of sensors 140 may also contain electronic conditioning circuits and software control for manipulating sensor data and making it available to the other blocks in the electronic device 100. The plurality of sensors 140 may provide additional data from physical measurements to the inertial sensor block 102 or processor 120 in order to increase the accuracy of the computed position related variables.

The display 150 may be a touch panel, and may be embodied as an LCD, LED, OLED, AMOLED, and the like. The input/output block 160 controls the interface to the user of the device 100. The audio block 170 provides for audio input and output to/from the device 100.

Figure 2:
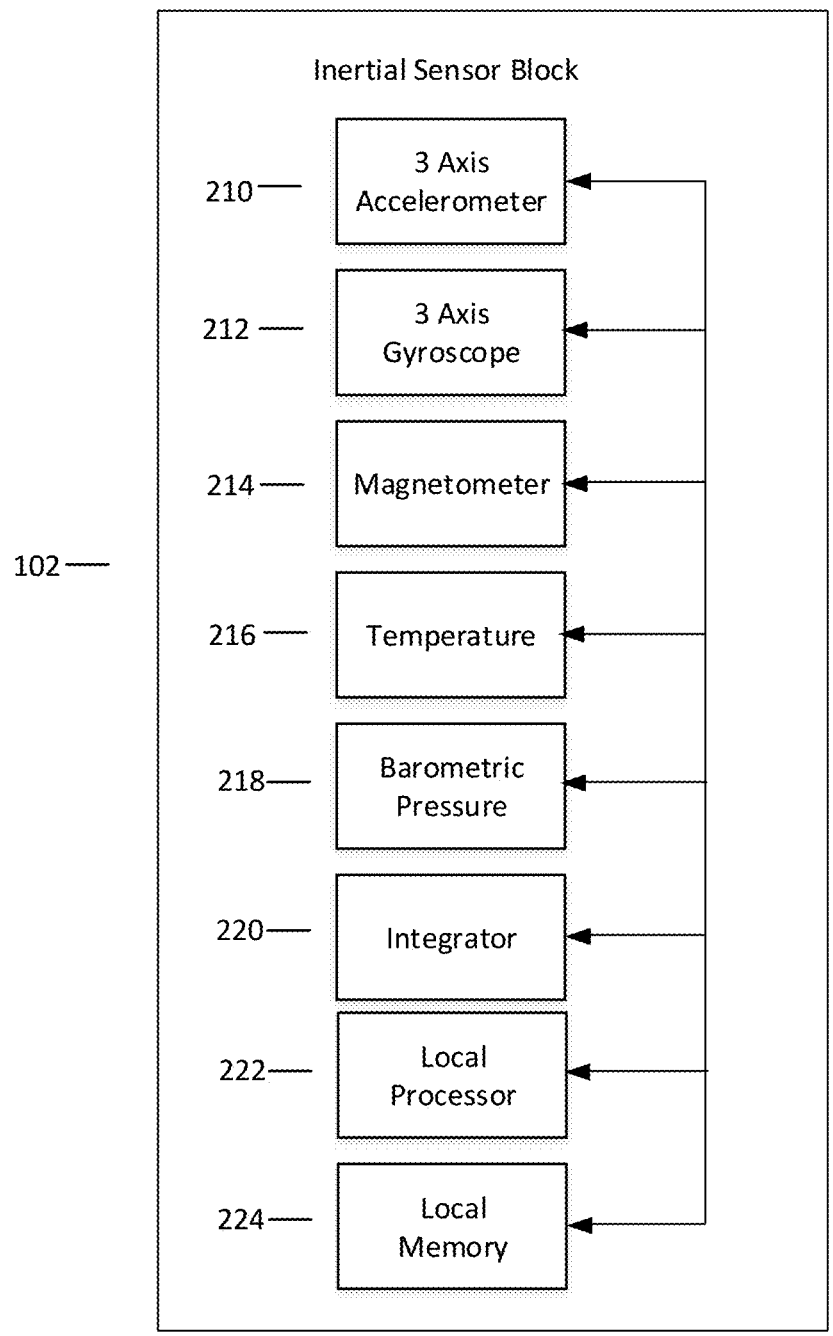
FIG. 2 is a schematic diagram of an inertial sensor block capable of providing inertial sensor data and other measured data required for positioning of an electronic device, according to an embodiment of the present disclosure.

FIG. 2 is a schematic diagram of an inertial sensor block 102 which is capable of determining position and other navigation variables according to an embodiment of the present disclosure. The three axis accelerometer 210 measures acceleration of the device in three orthogonal axes. The three axis accelerometer 210 may be a MEMS accelerometer which is particularly well suited to electronic devices due to low cost, low weight, small size and high accuracy. The three axis gyroscope 220 measures changes in orientation or direction of the device in three orthogonal axes. The three axis gyroscope 220 may be a MEMS gyroscope which is particularly well suited to electronic devices due to low cost, low weight, small size and high accuracy. The three axis gyroscope 220 and the three axis accelerometer 210 may be combined in a single package device. The magnetometer 214 is used to measure the earth's magnetic field and provide a compass like measurement based on the magnetic north direction. The temperature sensor 216 provides a measurement of the ambient temperature in order to compensate for any temperature dependent variables and increase the accuracy of the position determination. The barometric pressure sensor 218 measures the ambient atmospheric pressure and computes the altitude of the device based on the pressure measurement. The integrator 220 provides computational and filtering functions, (for example: Kalman filtering, acceleration data integration) specifically for the dead reckoning navigation. The local processor 222 provides data and Digital Signal Processing (DSP) specifically for the dead reckoning navigation. The local memory 224 provides program code storage and data storage including libraries, databases and polynomial coefficients specifically for the dead reckoning navigation.

Figure 3:
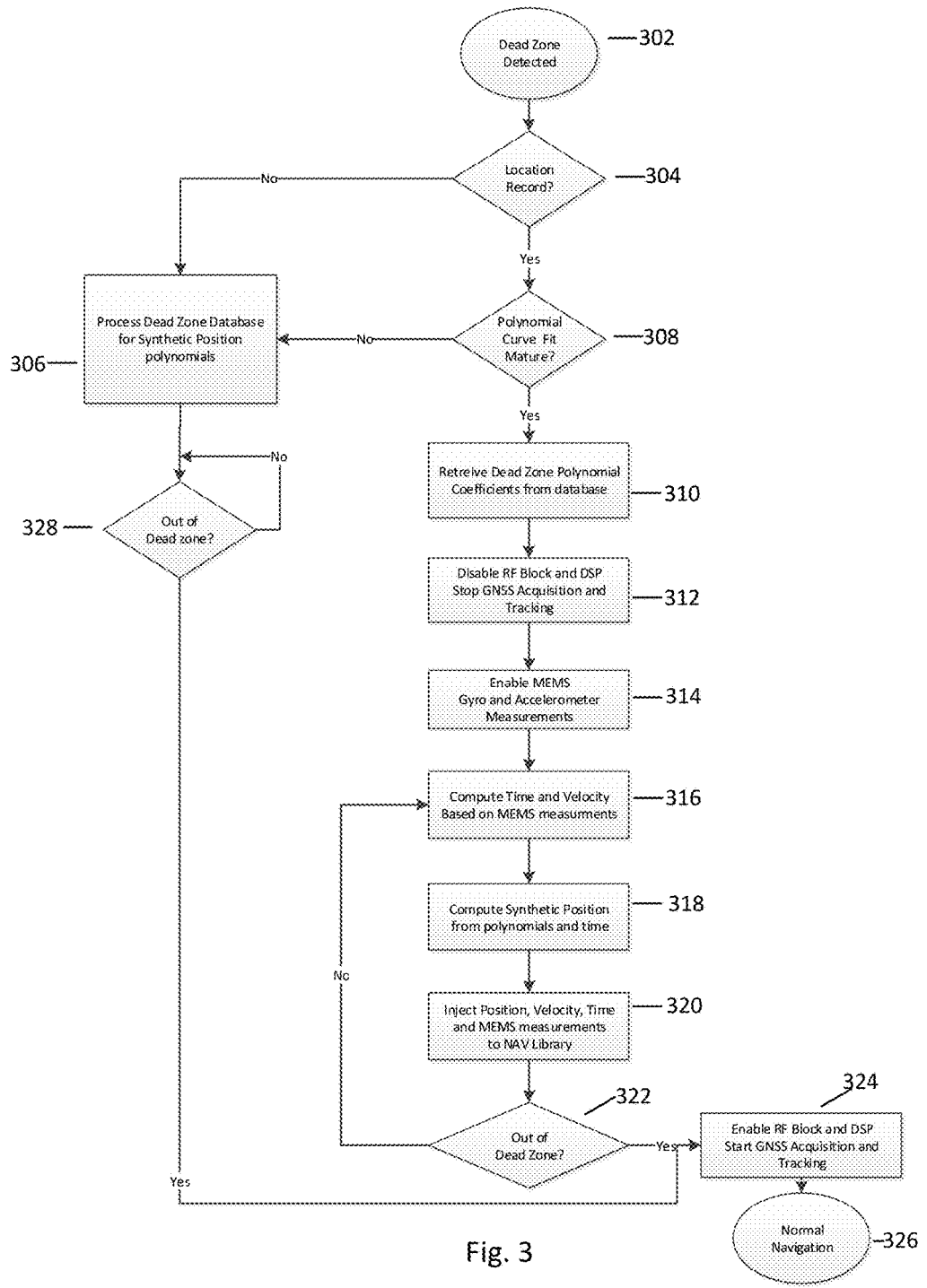
FIG. 3 is a flowchart of a method capable of determining position and reducing power consumption of an electronic device, according to an embodiment of the present disclosure.

FIG. 3 is a flowchart of a method capable of determining position and reducing power consumption according to an embodiment of the present disclosure. At 302, the present system determines whether a dead zone has been detected. The dead zone is detected by monitoring the measurement of the RF signal strength received by the GNSS receiver. The detection may be performed by the processor 120 reading a status register within the GNSS receiver through an application processor interface that indicates whether the GNSS receiver is capable of determining the position of the device. The detection may also be performed by the processor 120 reading the individual satellite received signal strength indicator within the GNSS receiver through an application processor interface. The processor 120 compares the received signal strength indicator to a predetermined threshold to determine whether the GNSS receiver is capable of determining the position of the device. At 304, the present system determines whether there is a database record for the last recorded receiver position. If the database is located in a remote server, at 310, the system connects to the server through the communication block 110 to make the determination if the last recorded position is in the database. If the position has not been stored in the database, the system activates a "learning mode" configured to dynamically build the database for the position and generates polynomial-fit curves at 306. At 328, the system will continue to monitor the GNSS receiver to determine if the electronic device is still in the dead zone. If the system determines it is out of the dead zone it will proceed to step 324 to enable the GNSS receiver and resume normal navigation.

While in the learning mode, the system tracks GNSS satellites that are available and detects entry and exit from dead zones using received signal strength indicators as described in step 302 above. Marking the positions of the dead zone entry and exit allows the system to fit a curve between the two points. Using inertial sensor data from the inertial sensor block 102 in addition to the positions determined by the GNSS receiver allows more points to fit the curve when creating a position model of the dead zone. With a mature polynomial fit model, the inertial sensor data alone can be used to determine the position along with a mature polynomial modeled curve.

In an embodiment of the present disclosure, each entry in the database may be stored as a minimum of four points specifying a cubic Bezier curve. The embodiment described below provides a cubic Bezier curve requiring four points in a spatial plane; however the present disclosure is not limited to a four point cubic Bezier curve and additional data will enable higher order curves. The curve is created using data from the electronic device 100 including the dead-zone entry location, dead-zone entry velocity, the exit location, dead-zone exit velocity, dead-zone entrance time and dead-zone exit time of the electronic device 100.

Figure 4:
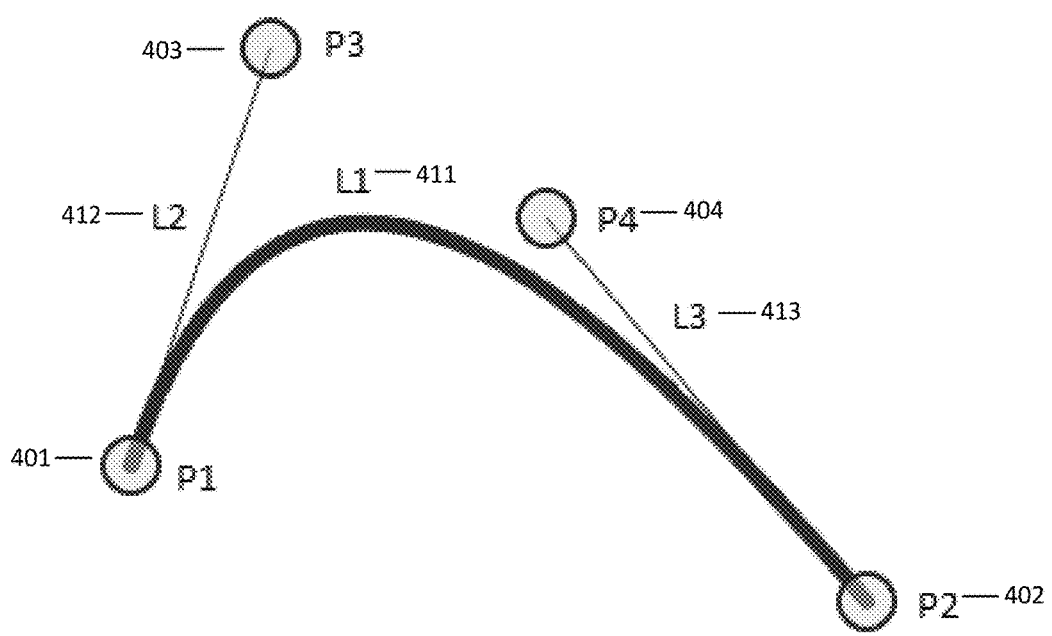
FIG. 4 is a diagram of a curve calculated for location determination, according to an embodiment of the present disclosure.

Referring to FIG. 4, point 1 401 represents the dead-zone entrance location and point 2 402 represents the dead-zone exit location. Point 3 403 and point 4 404 are points along the tangent lines defined by the GNSS receiver bearing at point 1 401 and point 2 402 respectively. The tangent lines can also be viewed as the direction of travel of the electronic device 100 at the point in time of entering the dead-zone. Point 3 403 and point 4 404 are calculated such that the length of the curve 411 is equal to $((V1+V2)/2)*(T2-T1)$, wherein V1 is the recorded velocity of the electronic device 100 at the dead-zone entrance location, V2 is the velocity of the electronic device 100 at the dead-zone exit location, T1 is the time of entrance to the dead-zone, and T2 is the time of exiting the dead-zone. There is no closed-form solution for the length of a cubic Bezier curve and therefore an iterative cost-minimization algorithm such as gradient descent may be used to determine the locations of point 3 403 and point 4 404. Using inertial sensor data including acceleration, bearing, velocity and time from the inertial sensor block 102, additional data points may be added to generate a more accurate piecewise curve defining the dead-zone. Using the above described dead-zone positioning method, an approximate position of the electronic device 100 may be obtained using inertial sensor-based dead-reckoning or the time of dead-zone entry of the electronic device 100 combined with the average velocity of the electronic device 100 when it entered the dead zone.

When the electronic device 100 is determined to be in a dead-zone location as indicated by the loss of satellite signals detected by the GNSS receiver 119, the electronic device 100 reports its last known position and velocity data to the database which may be located in a remote server which the electronic device 100 connects to through the communication block 110. Multiple electronic devices 100 entering a dead zone will each report their respective locations and velocities to the remote server upon detecting a dead-zone. In the remote server, a threshold-based clustering algorithm is applied. Once several nearby points have been reported as a dead-zone by multiple electronic devices 100, new entries are added to the database, using the calculated centroid of reported dead-zone entrance locations as point 1 401, the calculated centroid of reported dead-zone exit locations as point 2 402, the calculated centroid of computed points 3 403, and the calculated centroid of computed points 4 404.

Referring back to FIG. 3, in step 304, when there is a position record in the database, it is determined if the database storing the polynomial data is mature (i.e. has enough data to provide reliable Bezier curves) in step 308. When the polynomial fit is not mature as determined in step 308, the learning mode is returned to in step 306 which gathers data and updates the database which may be located in a remote server.

In step 310, when a polynomial fit model is mature and available for the position, the method retrieves the polynomial coefficients from the database and enters a synthetic positioning mode. In step 312, the electronic device's GNSS receiver 119 is disabled to stop GNSS satellite signal acquisition and tracking in order to reduce power consumption in the electronic device. In step 314, the inertial sensors in the inertial sensor block 102 are enabled and record measurements of the data captured by the three axis accelerometer 210, the three axis gyroscope 212, the magnetometer 214, the temperature sensor 216 and the barometric pressure sensor 218. The data captured by the inertial sensor block 102 is stored in memory 224 (or 130). In step 316, the position of the electronic device 100 is computed by using time and velocity measurements captured by the timing block 180 and the inertial sensor block 102, respectively. In step 318, a position is calculated using the inertial sensor data, the polynomial model, and time. In step 320, the position, velocity, time, and inertial sensor measurements are stored in memory 224. In step 322, the GNSS receiver again checks if the electronic device 100 is in a dead zone as described in step 302. If the electronic device 100 is still in a dead zone, the method returns to step 316 and computes time and velocity based on the inertial sensor block 102 and the timing block 180. In step 324, if the device 100 is no longer in a dead zone, the GNSS receiver block is enabled and begins position tracking based on satellite signals. In step 326, navigation returns to being based on GNSS receiver signals.

While the present disclosure has been particularly shown and described with reference to certain embodiments thereof, it will be understood by those of ordinary skill in the art that various changes in forms and details may be made therein without departing from the spirit and scope of the present device and method as defined by the following claims and their equivalents.

What is claimed is:

1. A device comprising:
a Global Navigation Satellite System (GNSS) receiver;
an inertial sensor block; and
a processor configured to:
monitor measurement of a signal strength received by the GNSS receiver;
determine that the device enters a dead zone where the GNSS receiver is incapable of determining a position of the device, when the signal strength falls below a predetermined threshold;
disable the GNSS receiver when the device enters the dead zone; and
perform navigation functions using data from the inertial sensor block and a remotely located database while the device is in the dead zone.

2. The device of claim 1, wherein the device further comprises a communications block for communicating data with the remotely located database.

3. The device of claim 1, wherein the navigation functions are performed using polynomial curve fitting.

4. The device of claim 3, wherein the data required for the polynomial curve fitting is retrieved from the remotely located database.

5. The device of claim 1, wherein the inertial sensor block includes at least one of an accelerometer, a gyroscope, a magnetometer, a temperature sensor and a barometric pressure sensor.

6. The device of claim 5, wherein at least one of the accelerometer, the gyroscope, the magnetometer, the temperature sensor and the barometric pressure sensor are microelectromechanical systems (MEMS) devices.

7. The device of claim 1, wherein the GNSS receiver is enabled when the device exits the dead zone.

8. The device of claim 1, wherein the dead zone is one of a tunnel, an urban canyon and a building.

9. A device comprising:
a Global Navigation Satellite System (GNSS) receiver; and
a processor configured to:
monitor measurement of a signal strength received by the GNSS receiver;
determine that the device enters a dead zone where the GNSS receiver is incapable of determining a position of the device, when the signal strength falls below a predetermined threshold
disable the GNSS receiver when the device enters the dead zone; and
perform navigation functions using data from a remotely located database, a recorded dead zone entry velocity, and time, while in the dead zone.

10. A method comprising the steps of:
receiving, at a processor of a device, signals from a GNSS receiver;
receiving, at the processor, inertial sensor data from an inertial sensor block;
monitoring measurement of a signal strength received by the GNSS receiver;
determining, by the processor, that the device enters a dead zone where the GNSS receiver is incapable of determining a position of the device, when the signal strength falls below a predetermined threshold;
disabling, by the processor, the GNSS receiver when the device enters the dead zone; and
performing, by the processor, navigation functions using data from the inertial sensor block and a remotely located database while in the dead zone.

11. The method of claim 10, further comprising communicating data from the GNSS receiver or the inertial sensor block to the remotely located database over a network.

12. The method of claim 10, wherein the navigation functions are performed using polynomial curve fitting.

13. The method of claim 12, wherein the data required for the polynomial curve fitting is retrieved from the remotely located database.

14. The method of claim 10, wherein the inertial sensor block includes at least one of an accelerometer, a gyroscope, a magnetometer, a temperature sensor and a barometric pressure sensor.

15. The method of claim 14, wherein at least one of the accelerometer, the gyroscope, the magnetometer, the temperature sensor and the barometric pressure sensor are microelectromechanical systems (MEMS) devices.

16. The method of claim 10, wherein the GNSS receiver is enabled when the device exits the dead zone.

17. The method of claim 11, wherein the remotely located database comprises inertial sensor data or GNSS data provided by a plurality of devices.

18. The method of claim 10, wherein the dead zone is one of a tunnel, an urban canyon and a building.

* * * * *